(No Model.) 2 Sheets—Sheet 1.

A. G. HOWLAND.
TWO WHEELED VEHICLE.

No. 512,824. Patented Jan. 16, 1894.

Witnesses
Inventor
Abiel Gifford Howland
By
Attorneys (No Model.) 2 Sheets—Sheet 2.
A. G. HOWLAND.
TWO WHEELED VEHICLE.
No. 512,824. Patented Jan. 16, 1894.
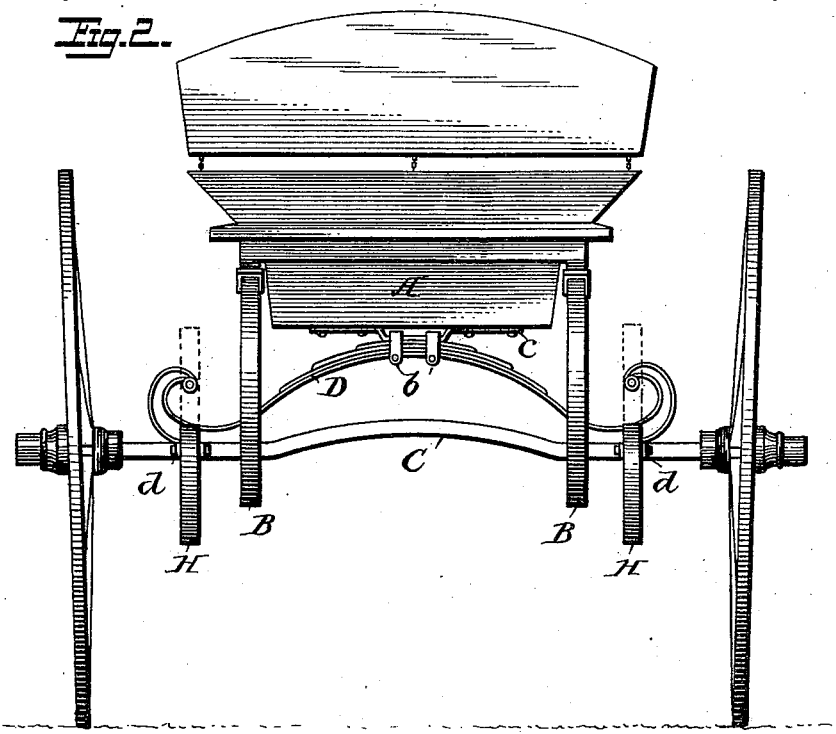
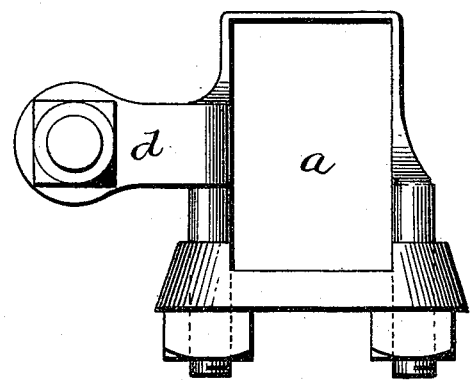
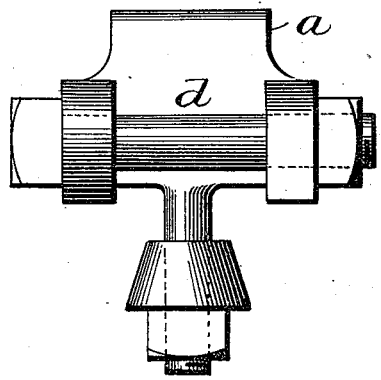

UNITED STATES PATENT OFFICE.

ABIEL GIFFORD HOWLAND, OF CHRISTCHURCH, NEW ZEALAND.

TWO-WHEELED VEHICLE.

SPECIFICATION forming part of Letters Patent No. 512,824, dated January 16, 1894.

Application filed June 23, 1893. Serial No. 478,647. (No model.) Patented in New Zealand November 12, 1892, No. 5,894.

*To all whom it may concern:*

Be it known that I, ABIEL GIFFORD HOWLAND, a subject of the Queen of Great Britain and Ireland, residing at Christchurch, in the Colony of New Zealand, have invented certain new and useful Improvements in Two-Wheeled Vehicles, (for which I have obtained a patent in New Zealand, dated November 12, 1892, No. 5,894,) of which the following is a specification.

This invention of improvements in the construction of vehicles having two wheels refers more particularly to the mode of mounting or hanging the body and shafts of the vehicle by means of scroll-springs thereby combining lightness with strength and causing the said vehicles to be very easy riding free from any disagreeable motion or vibration, and easy to enter and alight.

By reference to the annexed sheet of drawings the invention will be more readily understood.

Figure 1:
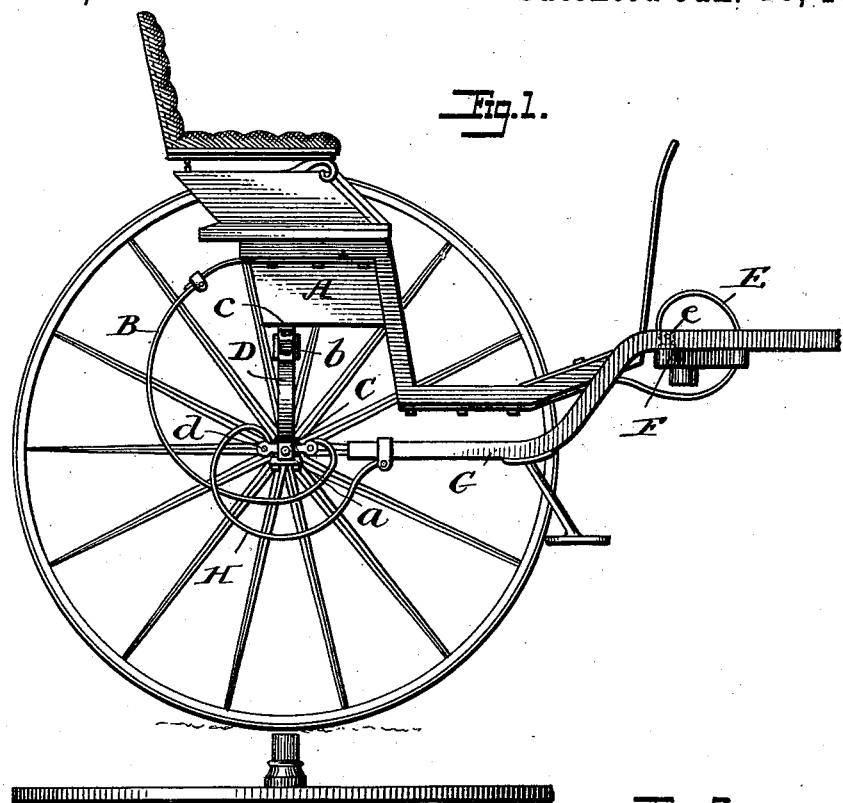
Figure 3:
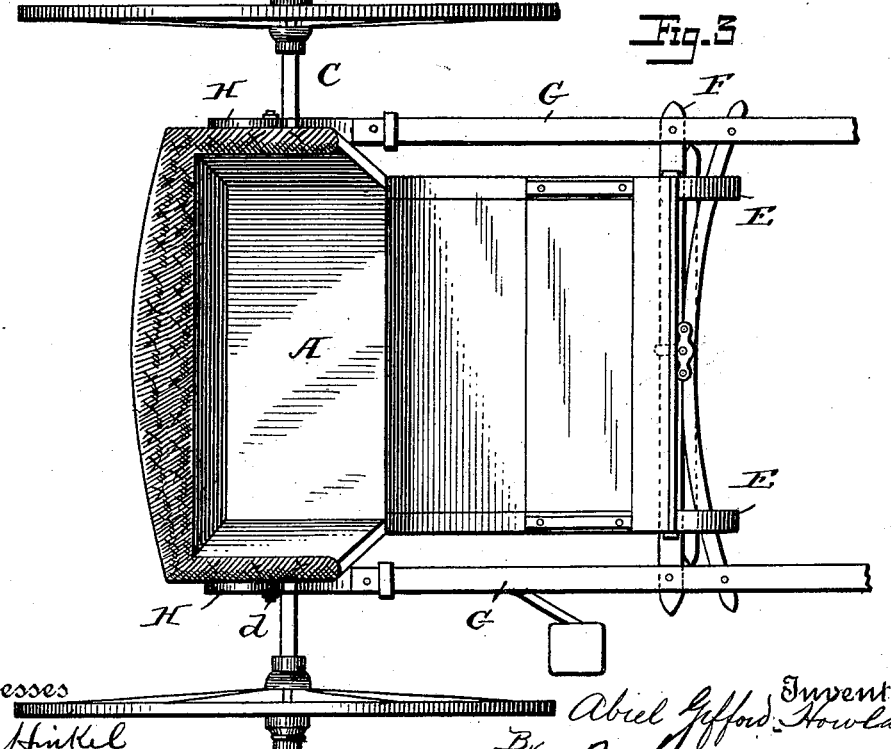

Figure 1 is a side view of my improved phaeton, one wheel being removed in order that the construction may be more easily seen. Figs. 2 and 3 are respectively a back view and plan of same. Figs. 4 and 5 are respectively a side and end view (full size) of the clip or coupling hereinafter referred to.

The same letters of reference indicate corresponding parts in each figure.

The body A rests upon two scroll-springs B, B; the upper ends of which are bolted to said body; the other ends being bolted to clips or couplings $a$ in front of axle C. The body A also rests upon a main scroll-spring D the upper side of which is attached, by means of clips $b$, to a plate $c$ bolted to under side of said body, while the ends are secured to top of axle C by means of clips or couplings $a$ and $a$. (See Figs. 4 and 5.)

The front portion of body A is hung upon two scroll springs E. E., the inner ends of which are bolted to under side of said body, while the outer ends are bolted to clips $e$ attached to cross bar F. The shafts G are hung to axle C by means of two scroll-springs H. H., the inner ends of which are bolted to said shafts, while the outer ends are bolted to clips or couplings $d$ attached to the axle C. The clips or couplings $a$ while securing the main scroll-spring D to the axle C also form couplings for scroll springs B. B., similarly the clips or couplings $d$ while securing the said main scroll spring to the axle C, also form couplings for scroll-springs H. H.

It will be readily seen that vehicles having the body and shafts thus mounted or hung, will be easy of draft, easy riding, and free from any disagreeable motion caused by the action of the horse, while a great saving of wear and tear is effected.

Having now particularly described and ascertained the nature of my said invention and in what manner the same is to be performed, I declare that what I claim is—

1. In two wheeled vehicles, the combination of the body A, supported at the sides upon scroll springs the lower ends of which are secured forwardly of the axle, the central scroll spring also supporting the body centrally and lengthwise of the axle, and having its ends secured to said axle, and the additional scroll springs secured to the under side of the body forwardly thereof, and attached to the cross piece, substantially as described.

2. In two wheeled vehicles the combination of the body, the scroll springs B, B and D, and similar springs E, all supporting said body, as described, the shafts and their scroll springs, and the clips or couplings $d$, to one end of which the side springs of the body are attached and to the opposite end of which the shaft springs are attached, substantially as described.

In testimony whereof I have signed my name to this specification in the presence of two subscribing witnesses.

ABIEL GIFFORD HOWLAND.

Witnesses:
 A. H. HART,
  *Christchurch, N. Z., Patent Agent.*
 GEORGE HART,
  *Clerk, Christchurch.*